(12) United States Patent
Probst et al.

(10) Patent No.: US 7,861,807 B2
(45) Date of Patent: Jan. 4, 2011

(54) DRILL BIT INCLUDING ONE PIECE CUTTING HEAD

(75) Inventors: Florian Probst, Hutthurm (DE); Thomas J. Quinn, Towson, MD (US); William R. Stumpf, Kingsville, MD (US); Albert Leidl, Passau (DE); Rudolf Jungwirth, Hutthurm (DE)

(73) Assignee: Black & Decker Inc., Newark, DE (US)

( * ) Notice: Subject to any disclaimer, the term of this patent is extended or adjusted under 35 U.S.C. 154(b) by 79 days.

(21) Appl. No.: 12/327,110

(22) Filed: Dec. 3, 2008

(65) Prior Publication Data

US 2010/0135741 A1    Jun. 3, 2010

(51) Int. Cl.
*E21B 10/36* (2006.01)

(52) U.S. Cl. ...................... 175/420; 175/415

(58) Field of Classification Search .............. 175/419, 175/420; 408/223, 224, 228
See application file for complete search history.

(56) References Cited

U.S. PATENT DOCUMENTS

| | | | |
|---|---|---|---|
| 335,470 A | 2/1886 | Moreau | |
| 616,273 A | 12/1898 | Strauser et al. | |
| 1,847,302 A | 3/1932 | Emmons | |
| 1,887,372 A | 11/1932 | Emmons | |
| 2,358,052 A | 9/1944 | Brown | |
| 2,370,706 A | 3/1945 | Andreasson | |
| 2,673,716 A | 3/1954 | Avery | |
| 2,858,718 A | 11/1958 | Kohler | |
| 2,865,606 A | 12/1958 | Farmer | |
| 2,895,355 A | 7/1959 | Kleine | |
| 2,912,887 A | 11/1959 | Andreasson | |
| 3,145,789 A | 8/1964 | Lawry | |
| 3,360,960 A | 1/1968 | Massey | |
| 3,469,643 A | 9/1969 | Ter Horst | |
| 3,548,688 A | 12/1970 | Kuch | |

(Continued)

FOREIGN PATENT DOCUMENTS

DE            23 58 447        3/1975

(Continued)

OTHER PUBLICATIONS

Merriam-Webster Dictionary definition of "edge", accessed Apr. 19, 2010, www.merriam-webster.com.*

(Continued)

*Primary Examiner*—Shane Bomar
*Assistant Examiner*—Blake Michener
(74) *Attorney, Agent, or Firm*—Scott B. Markow

(57) ABSTRACT

A cutting head for a drill bit has a body with an overall cruciform shape. One pair of opposing arms defines a main cutting edge. The other pair of opposing arms defines an auxiliary edge. The main cutting edge is defined by rake surfaces and relief surfaces. Each rake surface and relief surface is defined by a plurality of facets. The main cutting edge includes a chisel edge. A first pair of planar rake facets, one on each end of said chisel edge, and a first pair of planar relief facets, adjacent said chisel edge, defines a portion of the cutting edge. A remaining portion of the main cutting edge is defined at the apex of a plurality of curved rake facets and curved relief facets. The auxiliary edge is defined by a plurality of curved surfaces.

34 Claims, 10 Drawing Sheets

U.S. PATENT DOCUMENTS

| | | | |
|---|---|---|---|
| 3,749,189 A | 7/1973 | Boehm | |
| 3,912,414 A | 10/1975 | Fukura et al. | |
| 4,210,215 A | 7/1980 | Peetz et al. | |
| 4,549,616 A | 10/1985 | Rumpp et al. | |
| 4,561,813 A | 12/1985 | Schneider | |
| 4,579,180 A | 4/1986 | Peetz et al. | |
| 4,716,976 A * | 1/1988 | Isakov | 175/426 |
| 4,749,051 A | 6/1988 | Larsson | |
| 4,883,135 A | 11/1989 | Moser et al. | |
| 4,889,200 A * | 12/1989 | Moser | 175/394 |
| 4,903,787 A | 2/1990 | Moser et al. | |
| 4,967,855 A | 11/1990 | Moser | |
| 5,160,232 A * | 11/1992 | Maier | 408/223 |
| 5,273,380 A | 12/1993 | Musacchia | |
| 5,487,434 A | 1/1996 | Obermeier | |
| 5,492,187 A | 2/1996 | Neukirchen et al. | |
| 5,553,682 A | 9/1996 | Batliner et al. | |
| 5,641,028 A | 6/1997 | Resendez et al. | |
| 5,678,960 A | 10/1997 | Just et al. | |
| 5,800,101 A | 9/1998 | Jindai et al. | |
| 6,007,276 A | 12/1999 | Wardell | |
| 6,021,857 A | 2/2000 | Birk et al. | |
| 6,032,749 A | 3/2000 | Bongers-Ambrosius et al. | |
| 6,089,337 A | 7/2000 | Kleine et al. | |
| 6,102,634 A | 8/2000 | Turner et al. | |
| 6,116,361 A | 9/2000 | Kleine et al. | |
| 6,129,162 A | 10/2000 | Hauptmann | |
| 6,213,692 B1 * | 4/2001 | Guehring et al. | 408/144 |
| 6,250,857 B1 | 6/2001 | Kersten | |
| 6,260,637 B1 | 7/2001 | Haussmann et al. | |
| 6,270,297 B1 * | 8/2001 | Fang et al. | 408/227 |
| 6,283,232 B1 | 9/2001 | Batliner et al. | |
| 6,349,779 B1 | 2/2002 | Gilbert | |
| 6,427,789 B1 | 8/2002 | Fuss et al. | |
| 6,439,811 B1 | 8/2002 | Wardell | |
| 6,446,741 B1 * | 9/2002 | Kersten et al. | 175/428 |
| 6,450,272 B2 | 9/2002 | Hauptmann et al. | |
| 6,571,890 B2 | 6/2003 | Obermeier | |
| 6,588,519 B2 | 7/2003 | Knoller | |
| 6,595,305 B1 | 7/2003 | Dunn et al. | |
| 6,629,805 B1 | 10/2003 | Eischeid | |
| 6,637,987 B2 | 10/2003 | Lui et al. | |
| 6,652,203 B1 | 11/2003 | Risen, Jr. | |
| 6,655,479 B2 | 12/2003 | Kleine et al. | |
| 6,675,917 B2 | 1/2004 | Kleine et al. | |
| 6,702,047 B2 * | 3/2004 | Huber | 175/427 |
| 6,742,610 B2 | 6/2004 | Peetz | |
| 6,843,334 B2 | 1/2005 | Schautt | |
| 6,860,344 B2 | 3/2005 | Bise et al. | |
| 6,910,838 B2 | 6/2005 | Fuss | |
| 6,923,602 B2 | 8/2005 | Osawa et al. | |
| 6,929,434 B2 | 8/2005 | Prokop | |
| 6,976,812 B2 | 12/2005 | Kaneko et al. | |
| 7,001,120 B2 | 2/2006 | Moser et al. | |
| 7,097,396 B1 | 8/2006 | Miyanaga | |
| 7,137,461 B2 | 11/2006 | Meierhofer | |
| 7,137,462 B2 | 11/2006 | Miyanaga | |
| 7,163,363 B2 | 1/2007 | Defougeres et al. | |
| 7,201,543 B2 | 4/2007 | Mühlfriedel et al. | |
| 7,231,992 B2 | 6/2007 | Papousek | |
| D557,290 S | 12/2007 | Melegari | |
| 7,314,102 B2 | 1/2008 | Magin | |
| 7,455,129 B2 | 11/2008 | Widmann | |
| 7,497,282 B2 | 3/2009 | Batliner et al. | |
| 2001/0013430 A1 | 8/2001 | Hauptmann et al. | |
| 2002/0159851 A1 | 10/2002 | Krenzer | |
| 2003/0077134 A1 | 4/2003 | Moser et al. | |
| 2005/0053439 A1 | 3/2005 | Wang et al. | |
| 2005/0103532 A1 | 5/2005 | Magin | |
| 2005/0205306 A1 | 9/2005 | Miyanaga | |
| 2005/0274551 A1 | 12/2005 | Batliner et al. | |
| 2006/0032675 A1 | 2/2006 | Koch et al. | |
| 2006/0032676 A1 | 2/2006 | Papousek | |
| 2006/0118341 A1 | 6/2006 | Huber | |
| 2006/0243496 A1 | 11/2006 | Widmann | |
| 2007/0023188 A1 * | 2/2007 | Roberts et al. | 166/298 |
| 2007/0048100 A1 | 3/2007 | Boyd et al. | |
| 2007/0251733 A1 | 11/2007 | Hoeggeri et al. | |
| 2007/0251734 A1 | 11/2007 | Koch et al. | |
| 2007/0278016 A1 | 12/2007 | Koch | |
| 2008/0110679 A1 | 5/2008 | Koch | |
| 2008/0118317 A1 | 5/2008 | Assel | |
| 2008/0121437 A1 | 5/2008 | Koch et al. | |
| 2008/0149399 A1 | 6/2008 | Koch et al. | |

FOREIGN PATENT DOCUMENTS

| | | |
|---|---|---|
| DE | 2912394 | 10/1980 |
| DE | 93 19 009 | 3/1984 |
| DE | 40 12 772 | 10/1991 |
| DE | 44 07 119 | 6/1995 |
| DE | 44 42 266 | 5/1996 |
| DE | 197 09 771 | 9/1998 |
| DE | 297 23 938 | 8/1999 |
| DE | 199 15 304 | 9/2000 |
| DE | 100 38 039 | 2/2001 |
| DE | 100 09 732 | 9/2001 |
| DE | 100 53 344 | 5/2002 |
| DE | 102 08 630 | 4/2003 |
| DE | 10 2004 017 286 | 8/2005 |
| DE | 20 2007 014 367 | 2/2008 |
| DE | 20 2007 002 120 | 7/2008 |
| EP | 0 452 255 | 10/1991 |
| EP | 0 129 699 | 11/1993 |
| EP | 0 987 398 | 3/2000 |
| EP | 1 024 246 | 8/2000 |
| EP | 1 125 663 | 8/2001 |
| EP | 1 125 664 | 8/2001 |
| EP | 1 217 165 | 8/2004 |
| EP | 0 884 448 | 12/2004 |
| EP | 1 034 864 | 12/2004 |
| EP | 1 514 657 | 3/2005 |
| EP | 1 259 699 | 5/2005 |
| EP | 1 559 492 | 8/2005 |
| EP | 1 270 162 | 2/2006 |
| EP | 1 188 897 | 6/2006 |
| EP | 1 431 511 | 8/2006 |
| EP | 1 604 793 | 7/2007 |
| EP | 1 687 126 | 7/2007 |
| EP | 1 849 544 | 10/2007 |
| EP | 1 604 762 | 11/2007 |
| EP | 1 865 144 | 12/2007 |
| EP | 1 923 159 | 5/2008 |
| EP | 1 923 160 | 5/2008 |
| EP | 2 047 932 | 4/2009 |
| FR | 2 779 366 | 12/1999 |
| GB | 362 292 | 8/1974 |
| JP | 2000-117520 | 4/2000 |
| JP | 2000-190323 | 7/2000 |
| JP | 2001-179518 | 7/2001 |
| JP | 2001-334403 | 12/2001 |
| JP | 2002-225026 | 8/2002 |
| JP | 2004-001111 | 1/2004 |
| JP | 2004-148482 | 5/2004 |
| JP | 2005-178326 | 7/2005 |

| | | |
|---|---|---|
| JP | 2008-062620 | 3/2008 |
| SE | 675842 | 11/1990 |
| WO | WO 01/08840 | 2/2001 |
| WO | WO 2004/013450 | 2/2004 |
| WO | WO 2005/061838 | 7/2005 |
| WO | WO 2006/068937 | 6/2006 |
| WO | WO2008/095716 | 8/2008 |

OTHER PUBLICATIONS

Search Report—European Patent Office for related application EP09177759.

English Translation for JP2008-062620.

* cited by examiner

DRILL BIT INCLUDING ONE PIECE CUTTING HEAD

FIELD

The present disclosure relates to drill bits, especially to drill bits for hammer drilling into masonry, concrete, brick, stone, rock and the like (generally referred to as "masonry" drill bits). The disclosure also relates to a cutting head for such a drill bit.

BACKGROUND

German Patent Application DE 4012772 A1 discloses a hammer drill bit for use in rock or concrete, having a cemented-carbide cutting head insert with a cruciform shape comprising four radial cutters and a centering tip protruding above the cutters.

German Patent Application DE 19709771 A1 discloses a drill bit with a one-piece hardened metal cutting head having a main cutter and two secondary cutters, arranged generally in a cruciform shape. The main cutter is such that a complete rotation of the cutting head causes the main cutter to describe a substantially conical surface. The secondary cutters are positioned towards the circumferential edge of the cutting head, and describe a truncated conical surface.

United States Patent Application No. 2005/0274551 A1 discloses a drill bit having a drilling head formed as a hard material body with radial legs and having at least three radially extending cutting bits formed on the radial legs. The drilling head includes a centering tip having concave limiting surfaces stretching between linearly extending auxiliary cutting edges.

The present disclosure seeks to provide improved drill bits and improved cutting heads for drill bits.

SUMMARY

A first aspect of the disclosure provides a one-piece cutting head for a drill bit, comprising a main cutting edge extending substantially between opposite radial extremities of the cutting head. A plurality of arms extend substantially transverse thereto. The main cutting edge defines an edge between rake surfaces and relief surfaces of the cutting head. Each rake surface and each relief surface comprises a plurality of facets. Each adjacent facet has a transverse edge therebetween. Each transverse edge extends from the main cutting edge without meeting another transverse edge. Each facet also has an outer edge spaced apart from the main cutting edge. Each arm extends substantially from the outer edge of one or more facets.

A second aspect of the disclosure provides a one-piece cutting head for a drill bit. It comprises a forward-facing main cutting edge that extends substantially between opposite radial extremities of the cutting head. A plurality of arms extend substantially transverse thereto. The main cutting edge defines an edge between rake surfaces and relief surfaces of the cutting head. The arms provide forward-facing convex crushing surfaces and no forward-facing cutting edge.

According to a third aspect of the disclosure, a one-piece cutting head for a drill bit comprises a body having an overall cruciform shape. One pair of opposing arms defines a main cutting edge. The other pair of opposing arms defines an auxiliary surface. The main cutting edge is defined by rake surfaces and relief surfaces. Each rake surface and relief surface is defined by a plurality of facets. The main cutting edge includes a chisel edge. The first pair of planar rake facets are adjacent each end of the chisel edge. A pair of first planar relief facets are adjacent the chisel edge and define a portion of the cutting edge with the pair of planar rake facets. A remaining portion of the main cutting edge is defined by a plurality of curved rake facets and curved relief facets. The auxiliary edge is defined by a plurality of curved surfaces. Further, the remaining cutting edge portion may be defined by at least one concave rake facet. The remaining cutting edge portion may include at least one convex rake facet. The remaining edge portion may be defined by at least one convex relief facet. The remaining cutting edge portion may be defined by at least one concave relief facet. The auxiliary surface may include at least one convex surface. Alternatively, the auxiliary surface may include a plurality of convex surfaces. The auxiliary surface may include at least one concave surface. The auxiliary cutting surface portion defines a non-monotonic curve as it extends from the first portion to an end of the arm. The auxiliary surface may include a valley between the planar rake and relief facets and its end. The auxiliary surface may be a non-cutting surface. The auxiliary surface may be a curved cutting surface.

A further aspect of the disclosure provides a drill bit including a one piece cutting head of the first, second, or third aspect of the disclosure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
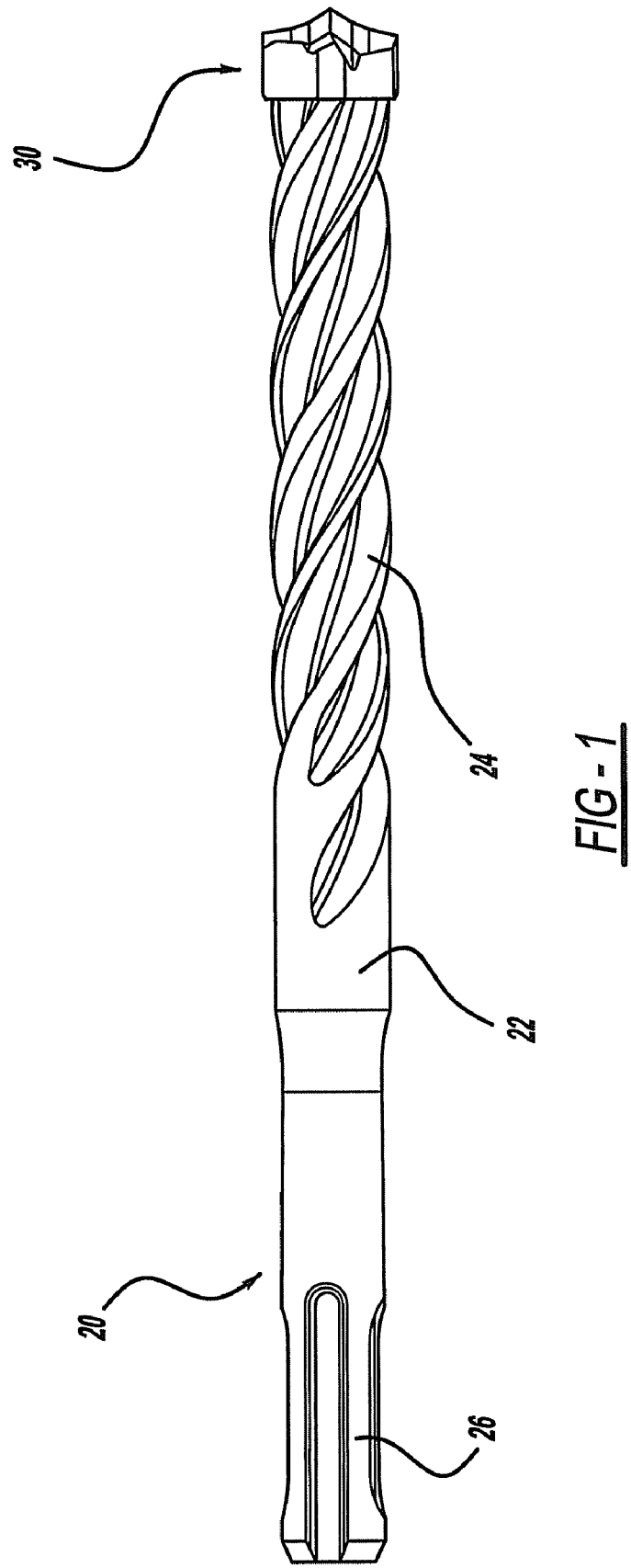
FIG. 1 is a perspective view of a drill bit in accordance with the present disclosure.

Turning to the figures, particularly FIG. 1, a drill bit is illustrated and designated with the reference numeral 20. The drill bit includes a body 22 that includes a fluted portion 24 and a shanking portion 26. The shanking portion 26 is generally a SDS, SDS Plus or SDS Max type. A one piece formed cutting head 30 is secured to the end of the flute portion 24. The flute portion 24 generally includes four flutes and four lands that terminate at the head and extend along the body in a helical pattern.

Turning to FIGS. 2-5, a first embodiment of the drill head 30 is illustrated. The drilling head 30 has an overall cruciform shape with two pairs of opposing arms 32, 34, 36 and 38. The opposing arms 32, 34 include the main cutting edge 40. The opposing arms 36, 38 include an auxiliary edge as will be described herein.

The main cutting head 40 is defined by the apex of rake faces 42 and 44 and relief faces 46 and 48, respectively. Both the rake surfaces 42 and 44 as well as the relief surfaces 46 and 48 are formed by a plurality of surface facets. The rake surfaces 42 and 44 are on opposing arms 32 and 34. The facets, identified below, of each of the rake surfaces 42, 44 are identical. The relief surfaces 46 and 48 on the opposing arms 32 and 34 likewise include identical facets as will be explained below.

The cutting edge 40 includes a chisel edge 50, first cutting portions 52 and remaining second cutting portions 56 and third cutting portions 58. The rake surfaces 42, 44 include a first facet 60 at an end adjacent to the chisel edge 50. The first facet 60 is a planar surface and extends from the first cutting portion 52 of the main cutting edge 40 towards an auxiliary arm. The second rake facet 62 is adjacent the first rake facet 60. The two facets 60, 62 defined a transverse edge 63 between them. The transverse edge 63 extends from the main cutting edge 40 without meeting another transverse edge. The second rake facet 62 has a convex surface.

The third rake facet 64 is adjacent to the second rake facet 62. The junction defines a transverse edge 65 that extends from the main cutting edge 40 without meeting another transverse edge. The third rake facet 64 has a concave surface.

The three rake facets 60, 62, 64 are all forward facing in terms of direction of rotation of the drill bit, in use. The three forward facing facets 60, 62 and 64 define a rake angle $\alpha$ that varies along the main cutting edge 40 from the axis of the drill bit 20 to its radial extremity. The rake angle $\alpha$ is the angle between a line drawn perpendicular to the axis of the drill bit and the forward facing surface of the cutting head when viewed from the side as in FIG. 3. It is designated with the reference $\alpha$. The rake surface facets 60, 62, 64 each have a rake angle of 38° to 48°, 28° to 48°, 28° to 58°, respectively. Immediately adjacent the first facet 60, the second rake surface facet 62 has a rake angle equal to the rake angle of the first facet 60. However, moving radially outward, this angle gradually decreases to 28° to 38° at the transverse edge 65 between the second rake facet 62 and the third rake facet 64. The third rake facet 64 has a rake angle that gradually increases, so that it reaches approximately 48° to 58° at the radial outermost end of the main cutting edge 40.

The rake surfaces 42 and 44 are identical and thus the explanation relates to both. The facets of the rake surface 44 are identified with reference numerals 60, 62 and 64.

Figure 2:
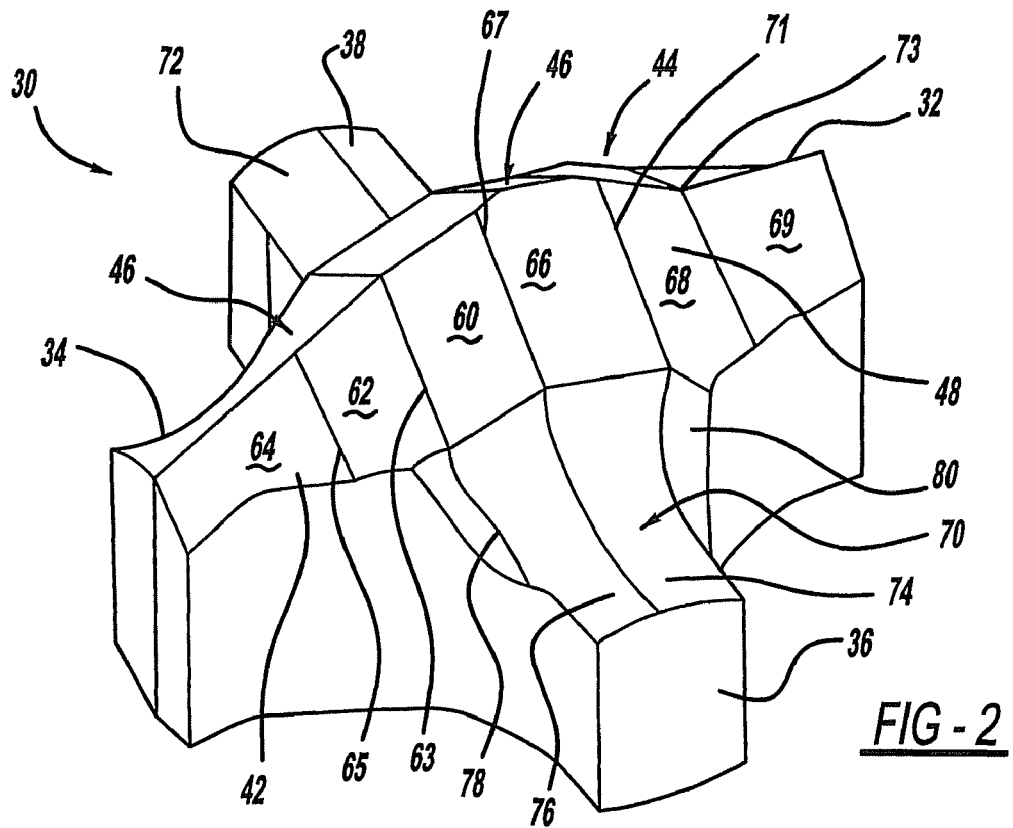
FIG. 2 is a perspective view of a first embodiment of a one piece cutting head for the drill bit of FIG. 1.
Figure 3:
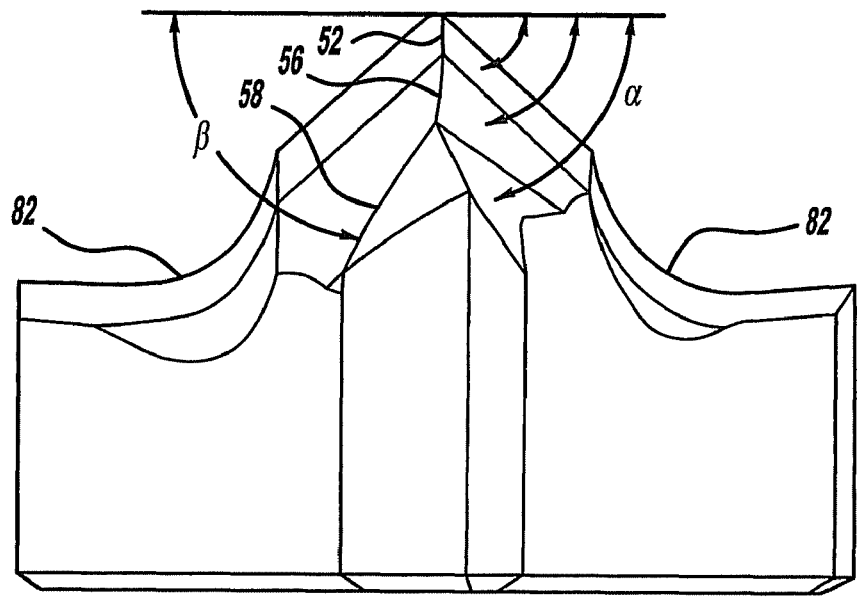
FIG. 3 is a side elevation view of FIG. 2.
Figure 5:
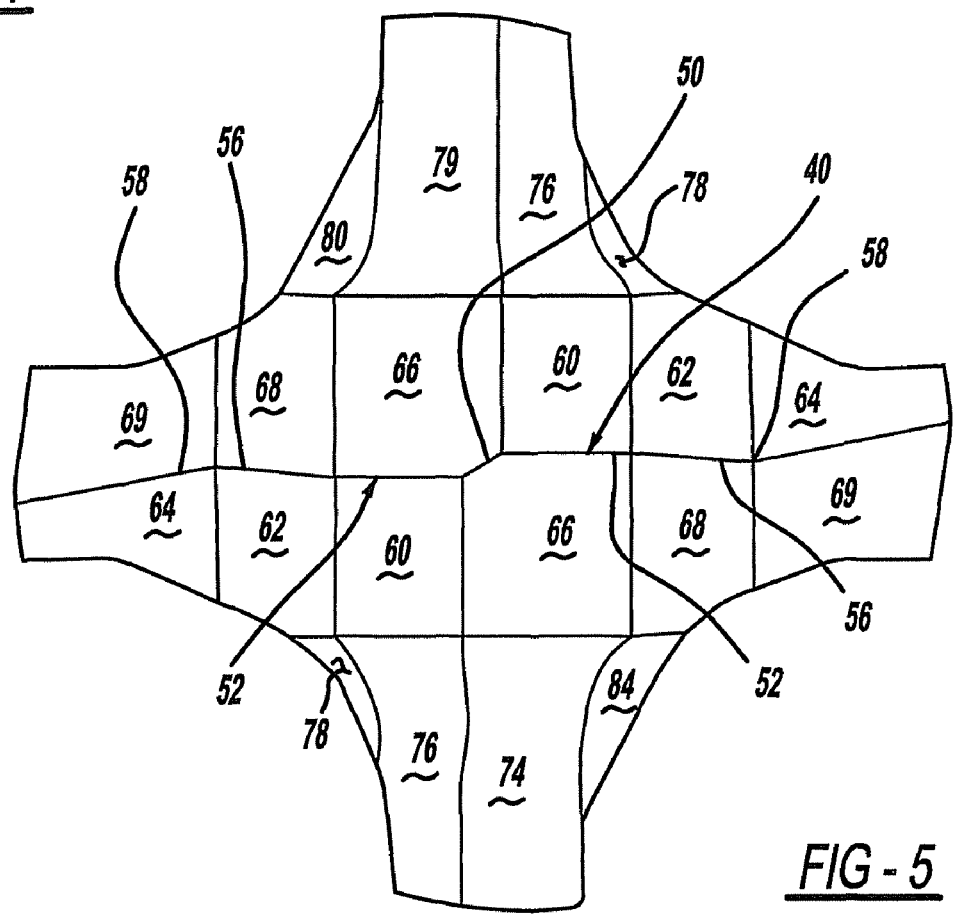
FIG. 5 is a top plan view of FIG. 2.

The relief surfaces 46 and 48 are identical and include a plurality of facets 66, 68, 69. The facet 66 has a planar surface and is adjacent both the first rake face facet 60 and the second relief surface facet 68, as seen in FIGS. 2 and 5. Thus, transverse edges 67 and 71, respectively, are formed between the adjacent facets. These transverse edges 67, 71 extend from the main cutting edge 40 without meeting another transverse edge. The second relief facet 68 is adjacent the first relief facet 66 and the third relief facet 69. The facet 68 has a convex-concave surface. The third relief facet 69 is adjacent the second relief facet 68. The third relief facet 69 extends to the end of the arms 32, 34. The third relief facet 69 has a concave-convex surface. A transverse edge 73 extends between the second and third relief facets 68, 69 from the main cutting edge 40 without meeting another transverse edge.

The first, second and third relief facets 66, 68, 69 are backward facing in terms of the direction of rotation of the drill bit. The first relief facet 66 has a relief angle $\beta$ of 38° to 48°. Likewise, the second relief facet 68 has a relief angle $\beta$ from 38° to 58°. The relief angle $\beta$ of the second relief facet 68 increases gradually on moving radially outward to 48° to 58°. The relief angle $\beta$ of the third relief facet 69 has a relief angle from 58° to 20°. The relief angle $\beta$ of the third facet 169 gradually decreases, so that it reaches approximately 20° to 30°, toward the radially outermost end of the main cutting edge 40.

The included angle $\delta$ between the rake surfaces 42, 44 and the relief surfaces 46, 48 of the main cutting edge 40 remains substantially constant at about 90°. This is despite the rake angle $\alpha$ and the relief angle $\beta$ varying in radial position with respect to the axis of the drill bit 20. Thus, as the rake angle $\alpha$ decreases, the relief angle $\beta$ increases by substantially the same amount, and vice versa, to keep the included angle $\delta$ substantially constant.

Figure 4:
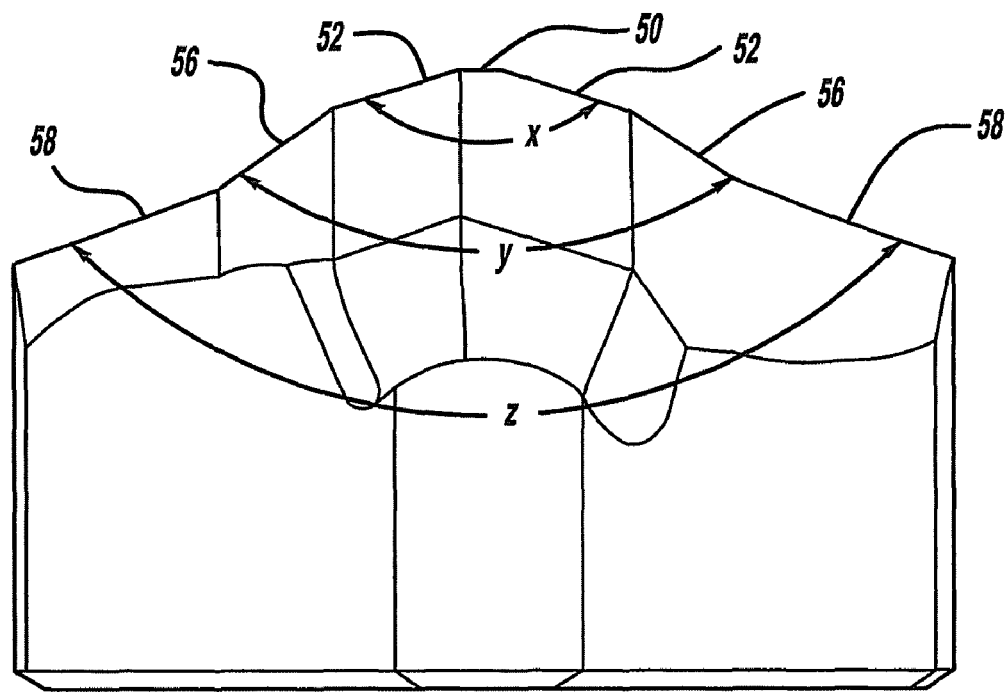
FIG. 4 is a side elevation view of FIG. 2, rotated 90°.

The central chisel edge 50 is perpendicular to the axis of the drill bit. Extending radially outward from the axis, the point angle varies stepwise to produce a stepped approximate roof shape. Thus, the point angle (X) between the first cutting edge portions 52 is 140° to 150°. The angle (Y) decreases to 105° to 115° along the second cutting edge portion 56 at the second rake face facet 62. The angle (Z) then increases again to 135° to 145° at third cutting edge portion 58 as seen in FIG. 4.

Figure 18:
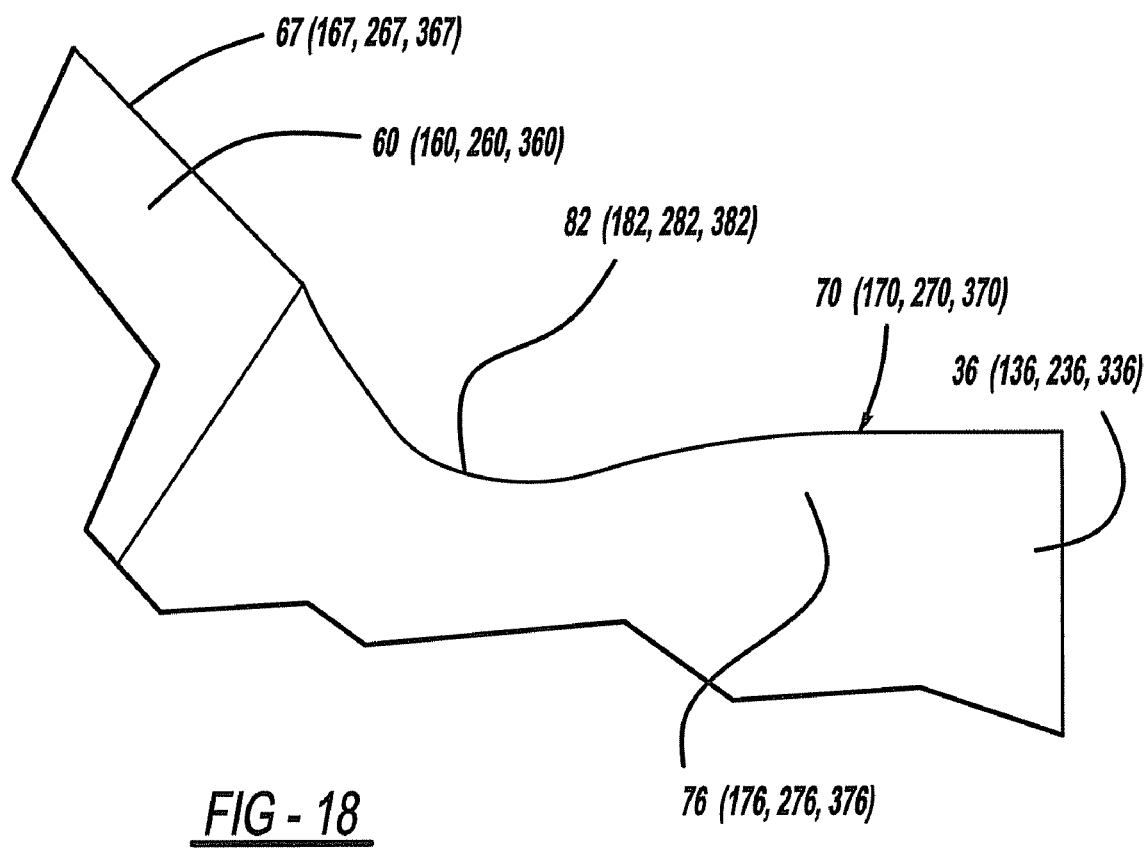
FIG. 18 is an enlarged elevation view of a portion of the auxiliary edge.

The opposing pair of legs 36 and 38 transverse to the main cutting edge 40 defines auxiliary or secondary crushing surfaces. The auxiliary surfaces include crushing surfaces 70 and 72. The surfaces 70, 72 do not have a cutting edge but include convex facets 74 and 76. The convex facets 74 and 76 are suitable for crushing masonry material and the like. Also, the auxiliary crushing surfaces 70 and 72 include concave facets 78 and 80 which transition into the rake surface 42, 44 and relief face 46, 48. The auxiliary crushing surfaces are axially further back than the entirety of the main cutting edge 40. The auxiliary surface extends from the first rake facet 60 and first relief facet 66 such that the auxiliary edge follows a non-monotonic curve. A dip or valley 82 is formed as the curve of the auxiliary surface reaches a bottom and then curves upwardly towards the extremities of the arms 36 and 38 as seen in FIG. 18. Thus, the line defining the curve of the auxiliary surface extends below the line defining the curve of the outer extremities of the secondary or auxiliary surface.

Turning to FIGS. 6-9, a second embodiment of a drill head 130 is shown. The drilling head 130 has an overall cruciform shape with two pairs of opposing arms 132, 134, 136 and 138. The opposing arms 132, 134 include the main cutting edge 140. The opposing arms 136, 138 include an auxiliary edge as will be described herein.

The main cutting head 140 is defined by the apex of the rake faces 142 and 144 and relief faces 146 and 148, respectively. Both the rake surfaces 142 and 144 as well as the relief surfaces 146 and 148 are formed by a plurality of surface facets. The rake surfaces 142 and 144 are on opposing arms 132 and 134. The facets, identified below, of the rake surfaces 142, 144 are identical. The relief surfaces 146 and 148 on the opposing arms 132 and 134 likewise include identical facets as will be explained below.

The cutting edge 140 includes a chisel edge 150, a first cutting portions 152 and remaining second cutting portions 156 and third cutting portions 158. The rake surface 142 includes a first facet 160 at an end adjacent to the chisel edge 150. The first facet 160 is a planar surface and extends from the first cutting portion 152 of the main cutting edge 140 towards an auxiliary arm. The second rake facet 162 is adjacent the first rake facet 160. The two facets 160, 162 defined a transverse edge 163 between them. The transverse edge 163 extends from the main cutting edge 140 without meeting another transverse edge. The second rake facet 162 has a convex surface.

A third rake facet 164 is adjacent to the second rake facet 162. The junction defines a transverse edge 165 that extends from the main cutting edge 140 without meeting another transverse edge. The third rake facet 164 has a concave surface.

The three rake facets 160, 162, 164 are all forward facing in terms of direction of rotation of the drill bit, in use. The three forward facing facets 160, 162 and 164 define a rake angle α that varies along the main cutting edge 140 from the axis of the drill bit 120 to its radial extremity. The rake angle α is the angle between a line drawn perpendicular to the axis of the drill bit and the forward facing surface of the cutting head when viewed from the side in FIG. 3. It is designated with the reference α. The rake surface facets 160, 162, 164 each have a rake angle of 38° to 48°, 28° to 48°, 28° to 58°, respectively. Immediately adjacent the first facet 160, the second rake surface facet 162 has a rake angle equal to the rake angle of the first facet 160. However, moving radially outward, this angle gradually decreases to 28° to 38° at the transverse edge 165 between the second rake facet 162 and the third rake facet 164. The third rake facet 164 has a rake angle that gradually increases, so that it reaches approximately 48° to 58° at the radial outermost end of the main cutting edge 140.

The rake surfaces 142 and 144 are identical and thus the explanation relates to both. The facets of the rake surface 144 are identified with reference numerals 160, 162 and 164.

Figure 6:
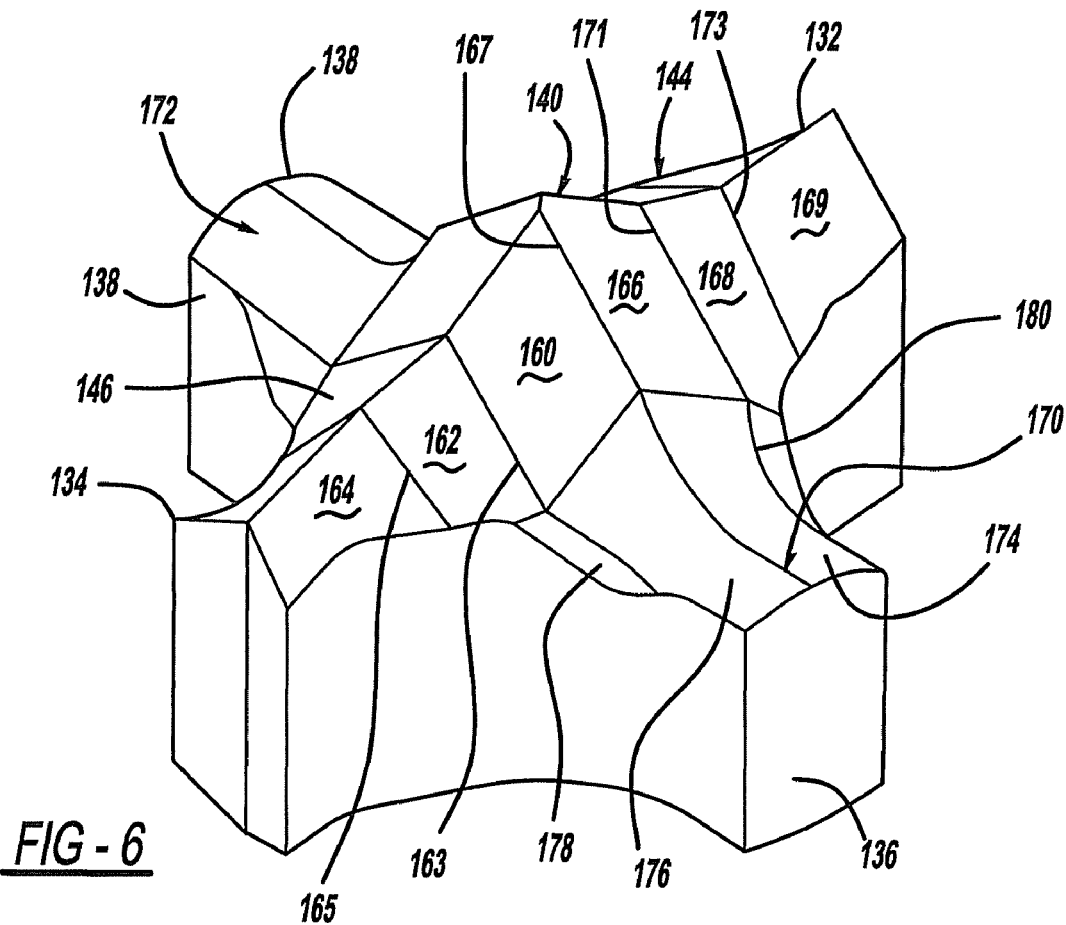
FIG. 6 is a perspective view of a second embodiment of a one piece cutting head for the drill bit of FIG. 1.
Figure 7:
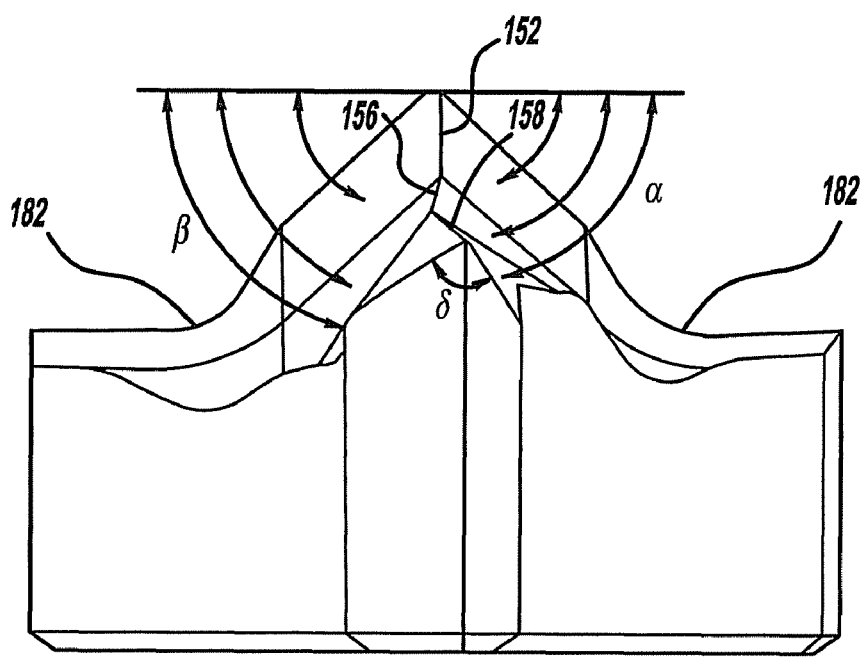
FIG. 7 is a side elevation view of FIG.6.
Figure 9:
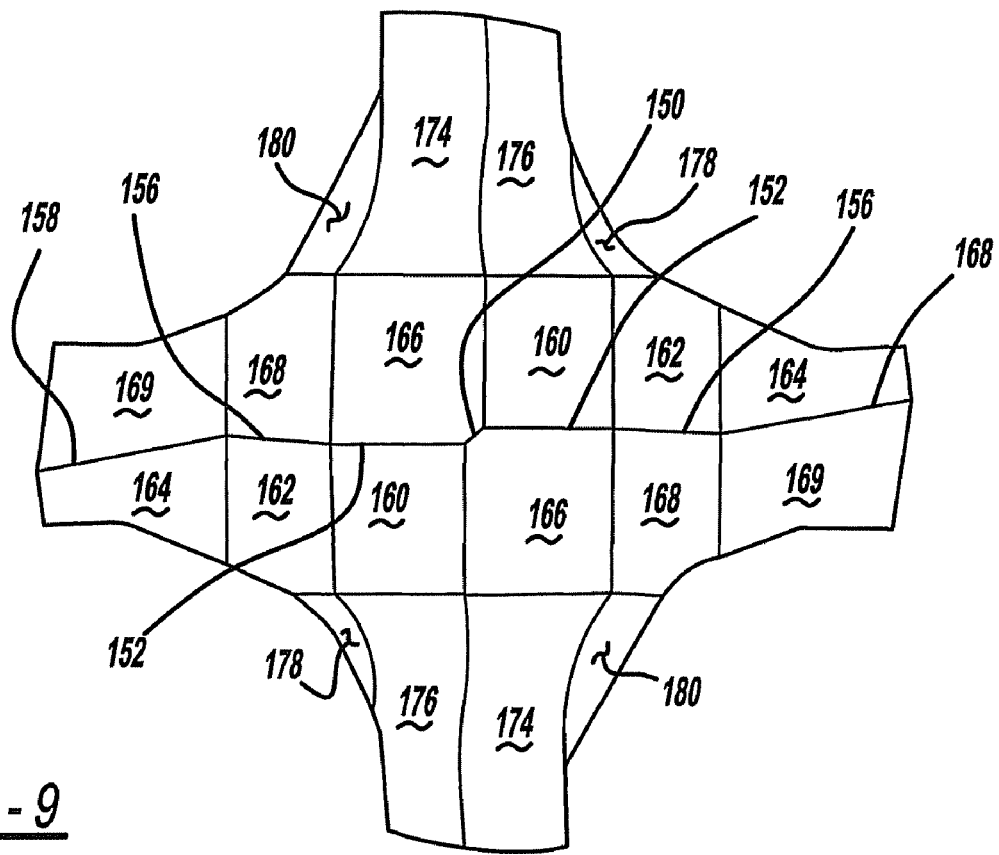
FIG. 9 is a top plan view of FIG. 6.

The relief surfaces 146 and 148 are identical and include a plurality of facets 166, 168, 169. The facet 166 has a planar surface and is adjacent both the first rake face facet 160 and the second relief surface facet 168, as seen in FIGS. 6 and 9. Thus, transverse edges 167 and 171, respectively, are formed between the adjacent facets. These transverse edges 167, 171 extend from the main cutting edge 140 without meeting another transverse edge. The second relief facet 168 is adjacent the first relief facet 166 and the third relief facet 169. The facet 168 has a convex-concave surface. The third relief facet 169 is adjacent the second relief facet 168. The third relief facet 169 extends to the end of the arms 132, 134. The third relief facet 169 has a concave-convex surface. A transverse edge 173 extends between the second and third relief facets 168, 169 from the main cutting edge 40 without meeting another transverse edge.

The first, second and third relief facets 166, 168, 169 are backward facing in terms of the direction of rotation of the drill bit. The first relief facet 166 has a relief angle β of 38° to 48°. Likewise, the second relief facet 168 has a relief angle β from 38° to 58°. The relief angle β of the second relief facet 168 increases gradually on moving radially outward to 48° to 58°. The relief angle β of the third relief facet 169 has a relief angle from 58° to 20°. The relief angle β of the third facet 169 gradually decreases, so that it reaches approximately 20° to 30°, toward the radially outermost end of the main cutting edge 140.

The included angle δ between the rake surfaces 142, 144 and the relief surfaces 146, 148 of the main cutting edge 140 remains substantially constant at about 90°. This is despite the rake angle α and the relief angle β varying in radial position with respect to the axis of the drill bit 120. Thus, as the rake angle α decreases, the relief angle β increases by substantially the same amount, and vice versa, to keep the included angle δ substantially constant.

Figure 8:
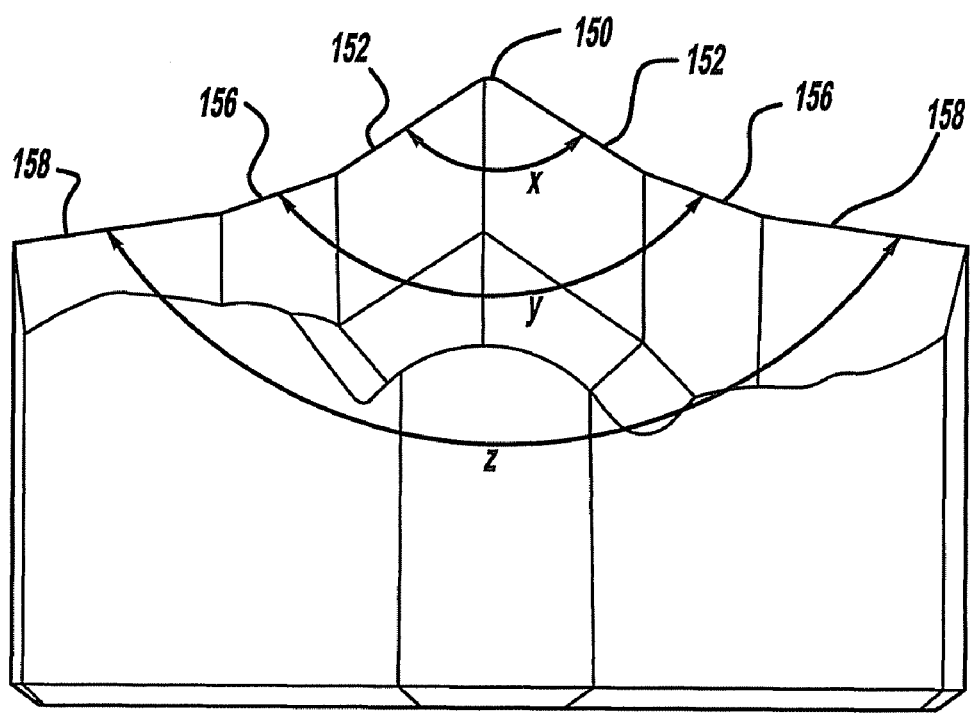
FIG. 8 is a side elevation view of FIG. 6, rotated 90°.

The central chisel edge 150 is perpendicular to the axis of the drill bit. Extending radially outward from the axis, the point angle varies stepwise to produce a stepped approximate roof shape. Thus, the point angle (X) between the first cutting edge portions 152 is 108° to 118°. The angle (Y) increases to 138° to 148° along the second cutting edge portion 156 at the second rake face facet 162. The angle (Z) then increases again to 157° to 167° at third cutting edge portion 158 as seen in FIG. 8.

The opposing pair of legs 136 and 138 transverse to the main cutting edge 140 define auxiliary or secondary crushing surfaces. The auxiliary surfaces include crushing surfaces 170 and 172. The surfaces 170, 172 do not have a cutting edge but include convex facets 174 and 176. The convex facets 174 and 176 are suitable for crushing masonry material and the like. Also, the auxiliary crushing surfaces 170 and 172 include concave facets 178 and 180 that transition into the rake surface 142, 144 and relief face 146, 148. The auxiliary crushing surfaces are axially further back than the entirety of the main cutting edge 140. The auxiliary surface extends from the first rake facet 160 and first relief facet 166 such that the auxiliary edge follows a non-monotonic curve. A dip or valley 182 is formed as the curve of the auxiliary surface reaches a bottom and then curves upwardly towards the extremities of the arms 136 and 138 as seen in FIG. 18. Thus, the line defining the curve of the auxiliary surface extends below the line defining the curve of the outer extremities of the secondary or auxiliary surface.

Turning to FIGS. 10-13, a third embodiment of the drill head 230 is illustrated. The drilling head 230 has an overall cruciform shape with two pairs of opposing arms 232, 234, 236 and 238. The opposing arms 232, 234 include the main cutting edge 240. The opposing arms 236, 238 include an auxiliary surface as will be described herein.

The main cutting head 240 is defined by the apex of rake faces 242 and 244 and relief faces 246 and 248, respectively. Both the rake surfaces 242 and 244 as well as the relief surfaces 246 and 248 are formed by a plurality of surface facets. The rake surfaces 242 and 244 are on opposing arms 232 and 234. The facets, identified below, of the rake surfaces 242, 244 are identical. The relief surfaces 246 and 248 on the opposing arms 232 and 234 likewise include identical facets as will be explained below.

The cutting edge 240 includes a chisel edge 250, a first cutting portions 252 and remaining second cutting portions 256 and third cutting portions 258. The rake surface 242 includes a first facet 260 at an end adjacent to the chisel edge 250. The first facet 260 is a planar surface and extends from the first cutting portion 252 of the main cutting edge 240 towards an auxiliary arm. The second rake facet 262 is adjacent the first rake facet 260. The two facets 260, 262 define a transverse edge 263 between them. The transverse edge 263 extends from the main cutting edge 240 without meeting another transverse edge. The second rake facet 262 has a convex surface.

The third rake facet 264 is adjacent to the second rake facet 262. The junction defines a transverse edge 265 that extends from the main cutting edge 240 without meeting another transverse edge. The third rake surface facet 264 has a concave surface.

The three rake facets 260, 262, 264 are all forward facing in terms of direction of rotation of the drill bit, in use. The three forward facing facets 260, 262 and 264 define a rake angle α that varies along the main cutting edge 240 from the axis of the drill bit 220 to its radial extremity. The rake angle α is the angle between a line drawn perpendicular to the axis of the drill bit and the forward facing surface of the cutting head when viewed from the side in FIG. 11. It is designated with the reference α. The rake surface facets 260, 262, 264 each have a rake angle of 38° to 48°, 28° to 48°, 28° to 58°, respectively. Immediately adjacent the first facet 260, the second rake surface facet 262 has a rake angle equal to the rake angle of the first facet 260. However, moving radially outward, this angle gradually decreases to 28° to 38° at the transverse edge 265 between the second rake facet 262 and the third rake facet 264. The third rake facet 264 has a rake angle that gradually increases, so that it reaches approximately 48° to 58° at the radial outermost end of the main cutting edge 240.

The rake surfaces 242 and 244 are identical and thus the explanation relates to both. The facets of the rake surface 244 are identified with reference numerals 260, 262 and 264.

Figure 10:
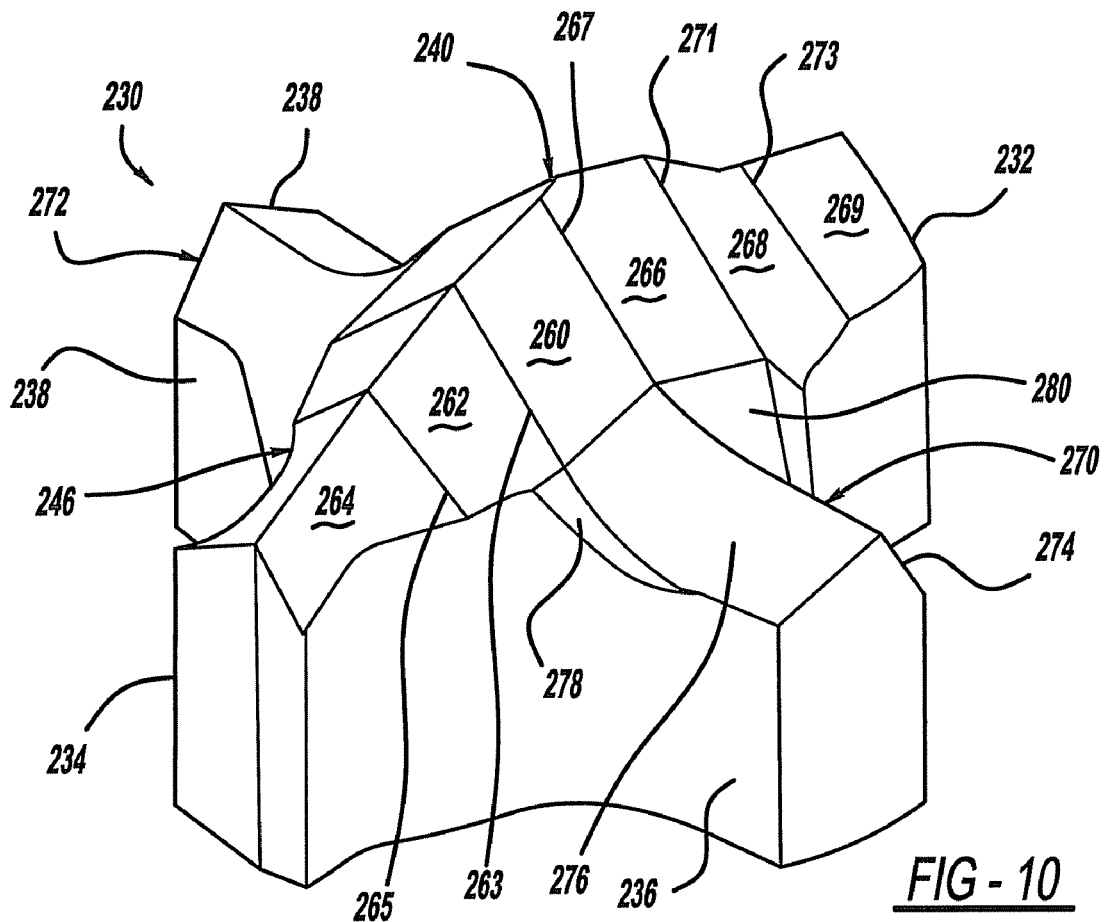
FIG. 10 is a perspective view of a third embodiment of a one piece cutting head for the drill bit of FIG. 1.
Figure 11:
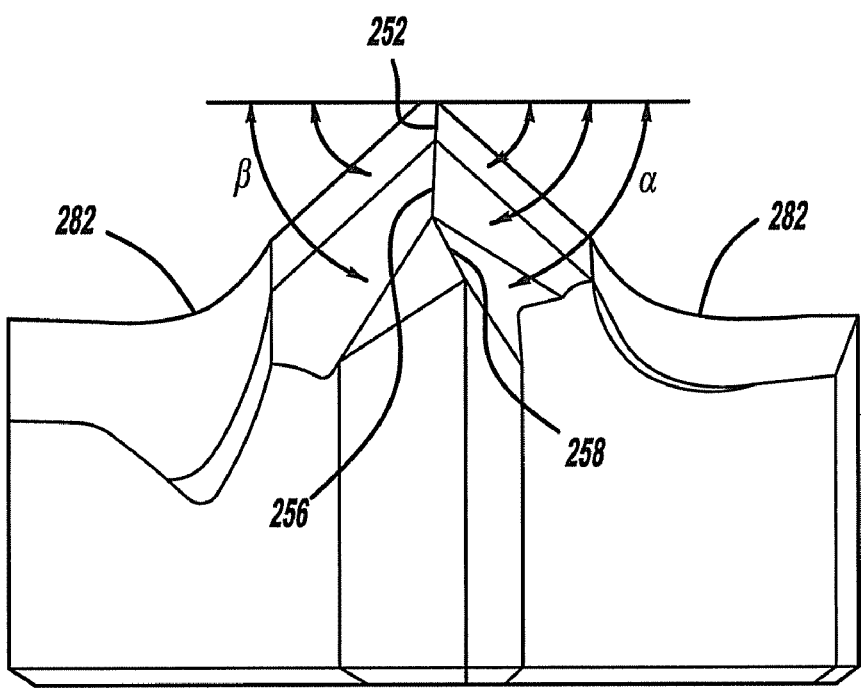
FIG. 11 is a side elevation view of FIG. 10.
Figure 13:
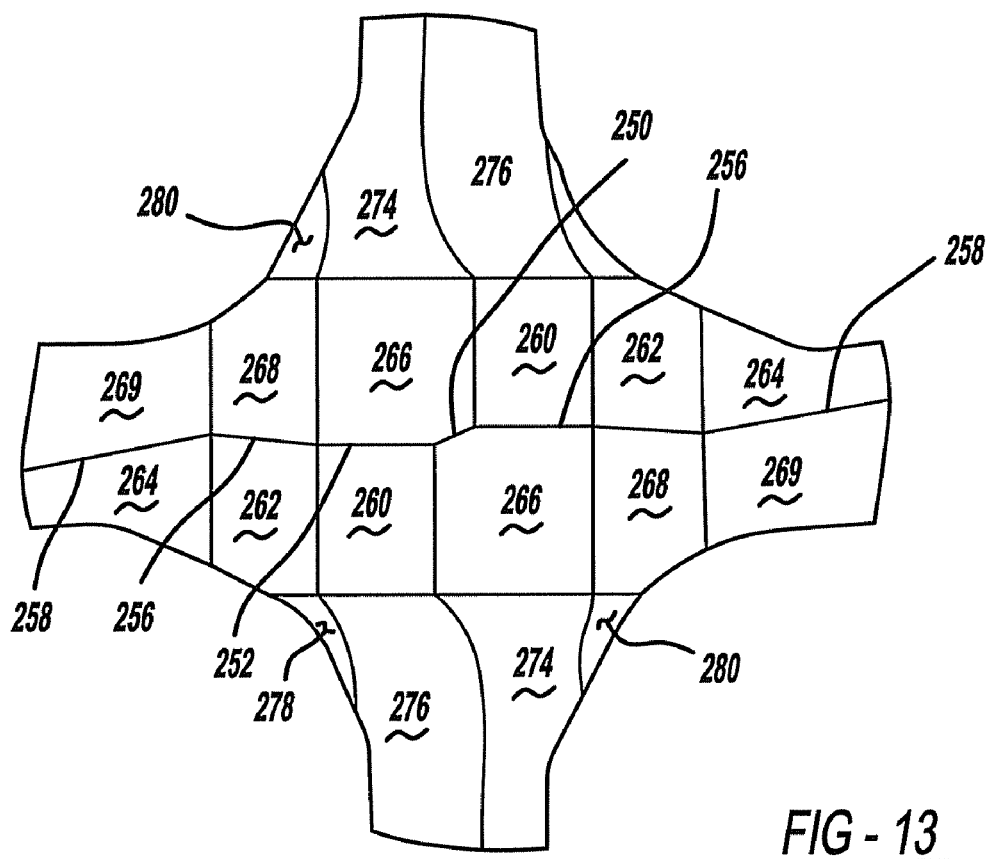
FIG. 13 is a top plan view of FIG. 10.

The relief surfaces 246 and 248 are identical and include a plurality of facets 266, 268, 269. The facet 266 has a planar surface and is adjacent both the first rake face facet 260 and the second relief surface facet 268, as seen in FIGS. 10 and 13. Thus, transverse edges 267 and 271, respectively, are formed between the adjacent facets. These transverse edges 267, 271 extend from the main cutting edge 240 without meeting another transverse edge. The second relief facet 268 is adjacent the first relief facet 266 and the third relief facet 269. The facet 268 has a convex-concave surface. The third relief facet 269 is adjacent the second relief facet 268. The third relief facet 269 extends to the end of the arms 232, 234. The third relief facet 269 has a concave-convex surface. A transverse edge 273 extends between the second and third relief facets 268, 269 from the main cutting edge 240 without meeting another transverse edge.

The first, second and third relief facets 266, 268, 269 are backward facing in terms of the direction of rotation of the drill bit. The first relief facet 266 has a relief angle β of 38° to 48°. Likewise, the second relief facet 268 has a relief angle β from 38° to 58°. The relief angle β of the second relief facet 268 increases gradually on moving radially outward to 48° to 58°. The relief angle β of the third relief facet 269 has a relief angle from 58° to 20°. The relief angle β of the third facet 269 gradually decreases, so that it reaches approximately 20° to 30°, toward the radially outermost end of the main cutting edge 240.

The included angle δ between the rake surfaces 242, 244 and the relief surfaces 246, 248 of the main cutting edge 240 remains substantially constant at about 90°. This is despite the rake angle α and the relief angle β varying in radial position with respect to the axis of the drill bit 220. Thus, as the rake angle α decreases, the relief angle β increases by substantially the same amount, and vice versa, to keep the included angle δ substantially constant.

Figure 12:
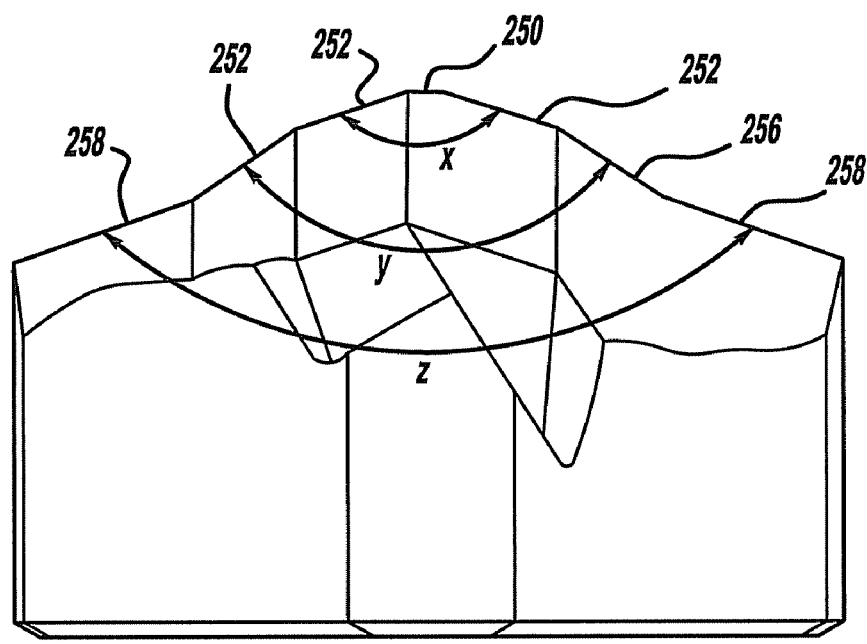
FIG. 12 is a side elevation view of FIG. 10, rotated 90°.

The central chisel edge 250 is perpendicular to the axis of the drill bit. Extending radially outward from the axis, the point angle varies stepwise to produce a stepped approximate roof shape. Thus, the point angle (X) between the first cutting edge portions 252 is 140° to 150°. This angle (Y) decreases to 105° to 115° along the second cutting edge portion 256 at the second rake face facet 262. The angle (Z) then increases again to 135° to 145° at third cutting edge portion 258 as seen in FIG. 12.

The opposing pair of legs 236 and 238 transverse to the main cutting edge 240 define auxiliary or secondary cutting surfaces comprising cutting edges. Each cutting edge has a rake surface 270 and a relief surface 272. The rake surfaces 270 have a concave facet 274. The relief surface 272 has a convex facet 276. The concave facets 274 are suitable for cutting and crushing masonry material and the like. Also, the rake and relief surfaces 270 and 272 include concave facets 278 and 280 that transition into the rake surface 242, 244 and relief face 246, 248. The auxiliary cutting edge is axially further back than the entirety of the main cutting edge 240. The auxiliary edge extends from the first rake facet 260 and first relief facet 266 such that the auxiliary edge follows a non-monotonic curve. A dip or valley 282 is formed as the curve of the auxiliary edge reaches a bottom and then curves upwardly towards the extremities of the arms 236 and 238 as seen in FIG. 18. Thus, the line defining the curve of the auxiliary edge extends below the line defining the curve of the outer extremities of the secondary or auxiliary edge.

Turning to FIGS. 14-17, a fourth embodiment of a drill head 330 is illustrated. The drilling head 330 has an overall cruciform shape with two pairs of opposing arms 332, 334, 336 and 338. The opposing arms 332, 334 include the main cutting edge 340. The opposing arms 336, 338 include an auxiliary edge as will be described herein.

The main cutting head 340 is defined by the apex of rake surfaces 342 and 344 and relief surfaces 346 and 348, respectively. Both the rake surfaces 342 and 344 as well as the relief surfaces 346 and 348 are formed by a plurality of surface facets. The rake surfaces 342 and 344 are on opposing arms 332 and 334. The facets, identified below, of the rake surfaces 342, 344 are identical. The relief surfaces 346 and 348 on the opposing arms 332 and 334 likewise include identical facets as will be explained below.

The cutting edge 340 includes a chisel edge 350, a first cutting portions 352 and remaining second cutting portions 356 and third cutting portions 358. The rake surface 342 includes a first facet 360 at an end adjacent to the chisel edge 350. The first facet 360 has a planar surface and extends from the first cutting portion 352 of the main cutting edge 340 towards an auxiliary arm. The second rake facet 362 is adjacent the first rake facet 360. The two facets 360, 362 defined a transverse edge 363 between them. The transverse edge 363 extends from the main cutting edge 340 without meeting another transverse edge. The second rake facet 362 has a convex surface.

The third rake facet 364 is adjacent to the second rake facet 362. The junction defines a transverse edge 365 that extends from the main cutting edge 340 without meeting another transverse edge. The third rake surface facet 364 has a concave surface.

The three rake facets 360, 362, 364 are all forward facing in terms of direction of rotation of the drill bit, in use. The three forward facing facets 360, 362 and 364 define a rake angle α that varies along the main cutting edge 340 from the axis of the drill bit 320 to its radial extremity. The rake angle α is the angle between a line drawn perpendicular to the axis of the drill bit and the forward facing surface of the cutting head when viewed from the side in FIG. 15. It is designated with the reference α. The rake surface facets 360, 362, 364 each have a rake angle of 38° to 48°, 28° to 48°, 28° to 58°, respectively. Immediately adjacent the first facet 360, the second rake surface facet 362 has a rake angle equal to the rake angle of the first facet 360. However, moving radially outward, this angle gradually decreases to 28° to 38° at the transverse edge 365 between the second rake facet 362 and the third rake facet 364. The third rake facet 364 has a rake angle that gradually increases, so that it reaches approximately 48° to 58° at the radial outermost end of the main cutting edge 340.

The rake surfaces 342 and 344 are identical and thus the explanation relates to both. The facets of the rake surface 344 are identified with reference numerals 360, 362 and 364.

Figure 14:
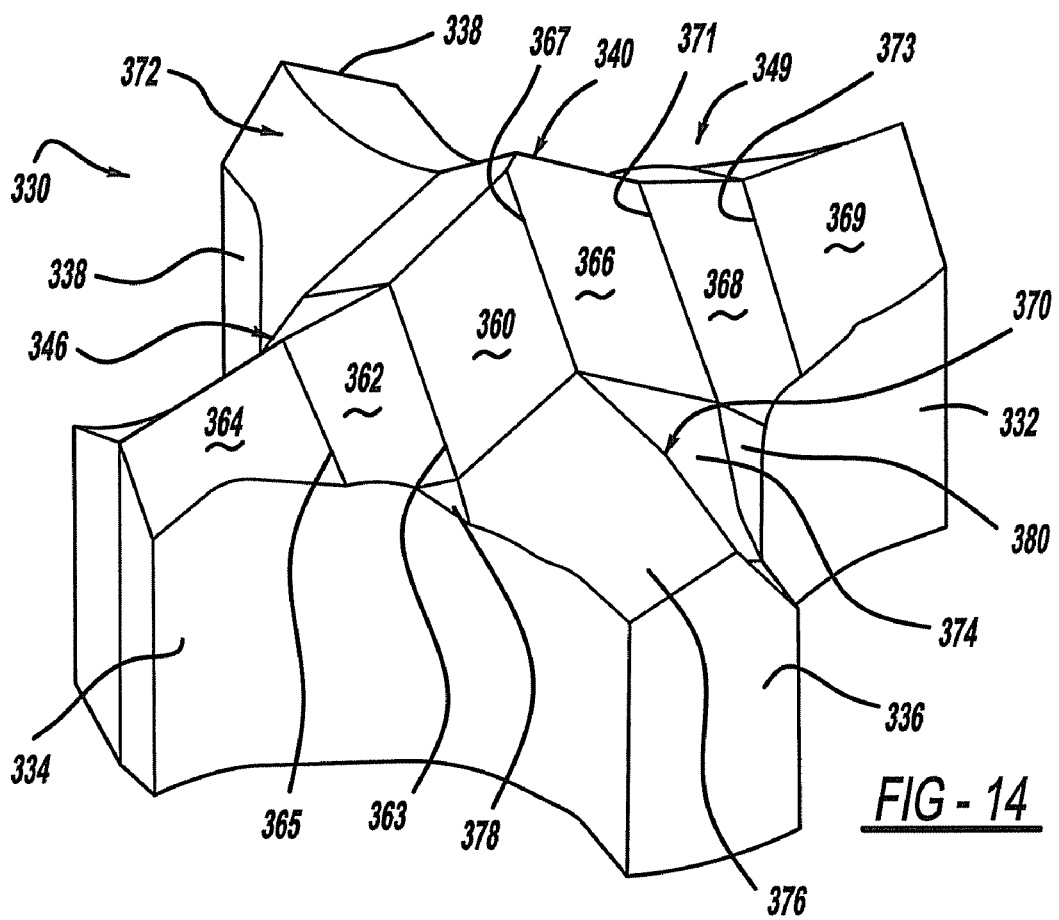
FIG. 14 is a perspective view of a fourth embodiment of a one piece cutting head for the drill bit of FIG. 1.
Figure 15:
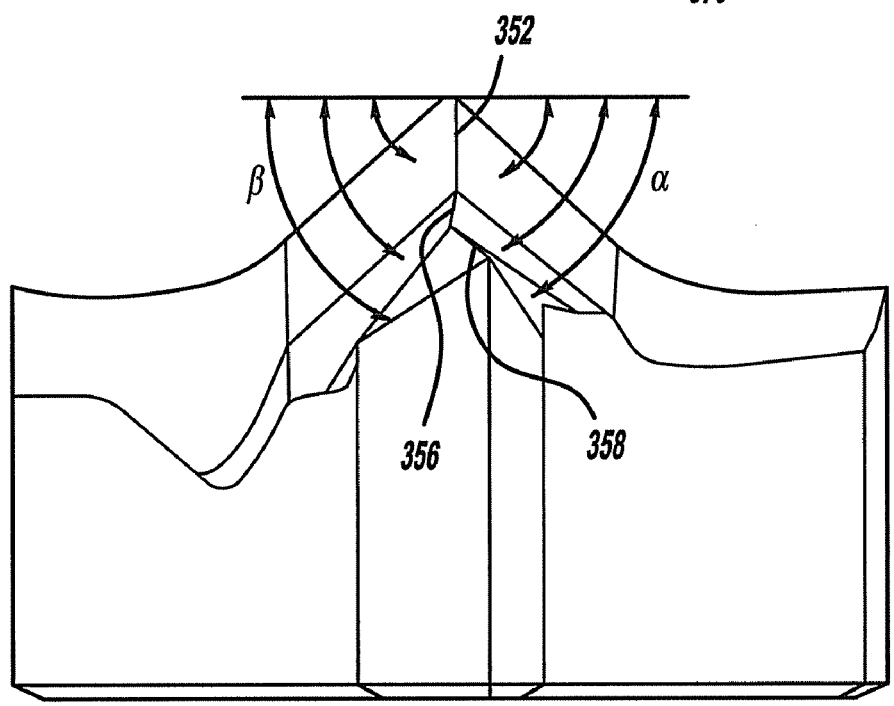
FIG. 15 is a side elevation view of FIG. 14.
Figure 17:
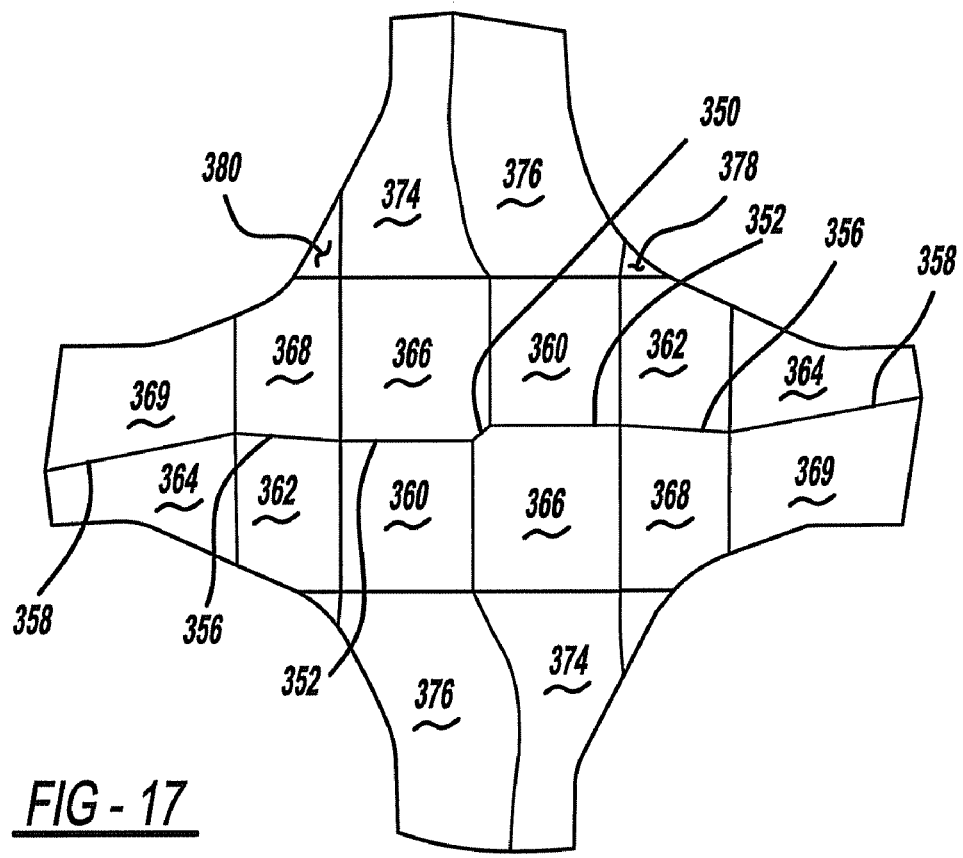
FIG. 17 is a top plan view of FIG. 14.

The relief surfaces 346 and 348 are identical and include a plurality of facets 366, 368, 369. The facet 366 has a planar surface and is adjacent both the first rake face facet 360 and the second relief surface facet 368, as seen in FIGS. 14 and 17. Thus, transverse edges 365 and 371, respectively, are formed between the adjacent facets. These transverse edges 367, 371 extend from the main cutting edge 340 without meeting another transverse edge. The second relief facet 368 is adjacent the first relief facet 366 and the third relief facet 369. The facet 368 has a concave surface. The third relief face 369 is adjacent the second relief facet 368. The third relief facet 369 extends to the end of the arms 332, 334. The third relief facet 369 has a concave-convex surface. A transverse edge 373 extends between the second and third relief facets from the main cutting edge 340 without meeting another transverse edge.

The first, second and third relief facets 366, 368, 369 are backward facing in terms of the direction of rotation of the drill bit. The first relief facet 366 has a relief angle β of 38° to 48°. Likewise, the second relief facet 368 has a relief angle β from 38° to 58°. The relief angle β of the second relief facet 368 increases gradually on moving radially outward to 48° to 58°. The relief angle β of the third relief facet 369 has a relief angle from 58° to 20°. The relief angle β of the third facet 369 gradually decreases, so that it reaches approximately 20° to 30°, toward the radially outermost end of the main cutting edge 340.

The included angle δ between the rake surfaces 342, 344 and the relief surfaces 346, 348 of the main cutting edge 340 remains substantially constant at about 90°. This is despite the rake angle α and the relief angle β varying in radial position with respect to the axis of the drill bit 320. Thus, as the rake angle α decreases, the relief angle β increases by substantially the same amount, and vice versa, to keep the included angle δ substantially constant.

Figure 16:
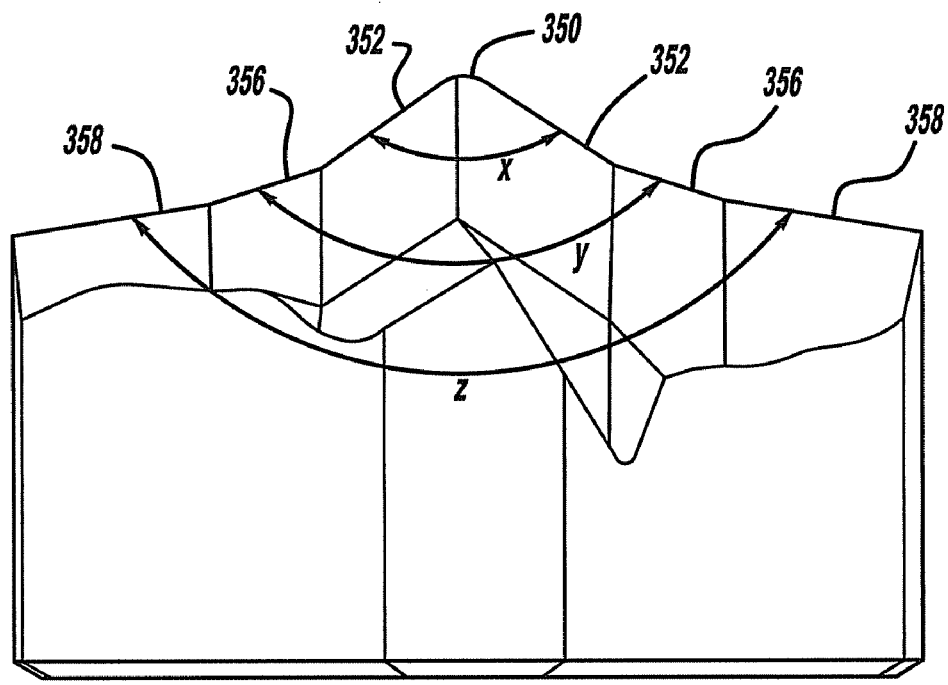
FIG. 16 is a side elevation view of FIG.14 rotated 90°.

The central chisel edge 350 is perpendicular to the axis of the drill bit. Extending radially outward from the axis, the point angle varies stepwise to produce a stepped approximate roof shape. Thus, the point angle (X) between the first cutting edge portions 352 is 108° to 118°. The angle (Y) increases to 138° to 148° along the second cutting edge portion 356 at the second rake face facet 362. The angle (Z) then increases again to 157° to 167° at third cutting edge portion 358 as seen in FIG. 16.

The opposing pair of legs 336 and 338 transverse to the main cutting edge 340 defines an auxiliary or secondary cutting edge. The cutting edge has rake surfaces 370 and relief surfaces 372. The rake surfaces 370 have concave facet 374. The relief surfaces 372 have convex facet 376. The concave facets 374 are suitable for cutting and crushing masonry material and the like. Also, the rake and relief surfaces 370 and 372 include concave facets 378 and 380 that transition into the rake surface 342, 344 and relief face 346, 348. The auxiliary cutting edges are axially further back then the entirety of the main cutting edge 340. The auxiliary edge extends from the first rake facet 360 and first relief facet 366 such that the auxiliary edge follows a non-monotonic curve. A dip or valley 382 is formed as the curve of the auxiliary edge reaches a bottom and then curves upwardly towards the extremities of the arms 336 and 338 as seen in FIG. 18. Thus, the line defining the curve of the auxiliary edge extends below the line defining the curve of the outer extremities of the secondary or auxiliary edge.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A cutting head comprising:
a body having an overall cruciform shape, one pair of opposing arms defining a main cutting edge and another pair of opposing arms defining an auxiliary surface, said main cutting edge defined by rake surfaces and relief surfaces, each rake surface and relief surface defined by a plurality of facets, said main cutting edge including a chisel edge, a first pair of planar rake facets are positioned, one on each end of said chisel edge, a first pair of planar relief facets are adjacent said chisel edge and define a portion of the cutting edge with said pair of planar rake facets, a remaining portion of the main cutting edge defined by a plurality of curved rake facets and curved relief facets and said auxiliary surface defined by a plurality of curved surfaces, wherein said plurality of curved rake facets include at least one convex rake facet.

2. The cutting head of claim 1, wherein said remaining cutting edge portion is defined by at least one concave rake face facet.

3. The cutting head of claim 1, wherein said remaining cutting edge portion is defined by at least one convex relief surface facet.

4. The cutting head of claim 1, wherein said remaining cutting edge portion is defined by at least one concave relief surface facet.

5. The cutting head of claim 1, wherein said auxiliary surface includes at least one convex surface.

6. The cutting head of claim 1, wherein said auxiliary surface includes a plurality of convex surfaces.

7. The cutting head of claim 1, wherein said auxiliary surface includes at least one concave surface.

8. The cutting head of claim 7, wherein said auxiliary surface includes at least one convex surface.

9. The cutting head of claim 1, wherein said auxiliary surface defines a non-monotonic curve as said auxiliary surface extends from said planar rake facet to an end of said arm.

10. The cutting head of claim 9, wherein said auxiliary surface includes a valley.

11. The cutting head of claim 1, wherein the auxiliary surface is a non-cutting surface.

12. The cutting head of claim 1, wherein the auxiliary surface is a curved crushing surface.

13. The cutting head of claim 1, wherein the auxiliary surface comprises a cutting edge.

14. A drill bit including a one piece head of claim 1.

15. The cutting head of claim 1, wherein the rake face facets each define a rake angle with the rake angle of a radial outermost rake face facet greater than the rake angle of the planar rake face facet.

16. The cutting head of claim 15, wherein the rake angle of a rake face facet between the planar rake face facet and the radial outermost rake face facet is less than the rake angle of the planar rake face facet.

17. The cutting head of claim 15, wherein an included angle between each rake face facet and its adjacent relief face facet is substantially the same.

18. A one-piece cutting head for a drill bit, comprising:
a main cutting edge extending substantially between opposite radial extremities of the cutting head;
a plurality of arms extending substantially transverse to said main cutting edge, said main cutting edge defines an edge between rake surfaces and relief surfaces of the cutting head:
each rake surface and each relief surface comprising a plurality of facets, each adjacent facet has a transverse edge between the facets, each transverse edge extending from the main cutting edge without meeting another transverse edge;
each facet also has an outer edge spaced radially outwardly apart from the main cutting edge; and
each arm extends substantially radially outwardly from the outer edge of one or more facets.

19. A drill bit including a one piece head of claim 18.

20. The cutting head of claim 18, wherein the plurality of rake face facets comprise at least one planar facet and at least one curved facet.

21. The cutting head of claim 18, wherein the plurality of relief face facets comprise at least one planar facet and at least one curved facet.

22. The cutting head of claim 18, wherein each arm has an auxiliary non-cutting surface.

23. The cutting head of claim 22, wherein the auxiliary non-cutting surface comprises a curved crushing surface.

24. The cutting head of claim 18, wherein each of the plurality of rake face facets each define a rake angle with the rake angle of a radial outermost rake face facet greater than the rake angle of a radial innermost rake face facet.

25. The cutting head of claim 24, wherein the rake angle of a rake face facet between the radial innermost rake face facet and the radial outermost rake face facet is less than the rake angle of the innermost rake face facet.

26. The cutting head of claim 24, wherein an included angle between each rake face facet and its adjacent relief face facet is substantially the same.

27. A one-piece cutting head for a drill bit comprising:
a forward-facing main cutting edge that extends continuously from a first radial extremity to a second opposite radial extremity of the cutting head;
a plurality of arms extending substantially transverse to said main cutting edge, said main cutting edge defines an edge between rake surfaces and relief surfaces of the cutting head; and
the arms provide forward-facing convex crushing surfaces and no forward-facing cutting edge.

28. A drill bit including a one piece head of claim 27.

29. The cutting head of claim 27, wherein each rake surface and each relief surface comprises a plurality of facets.

30. The cutting head of claim 29, wherein the plurality of rake face facets comprise at least one planar facet and at least one curved facet.

31. The cutting head of claim 29, wherein the plurality of relief ace facets comprise at least one planar facet and at least one curved facet.

32. The cutting head of claim 29, wherein each of the plurality of rake face facets each define a rake angle with the rake angle of a radial outermost rake face facet greater than the rake angle of a radial innermost rake face facet.

33. The cutting head of claim 32, wherein the rake angle of a rake face facet between the radial innermost rake face facet and the radial outermost rake face facet is less than the rake angle of the innermost rake face facet.

34. The cutting head of claim 33, wherein an included angle between each rake face facet and its adjacent relief face facet is substantially the same.

\* \* \* \* \*